UNITED STATES PATENT OFFICE.

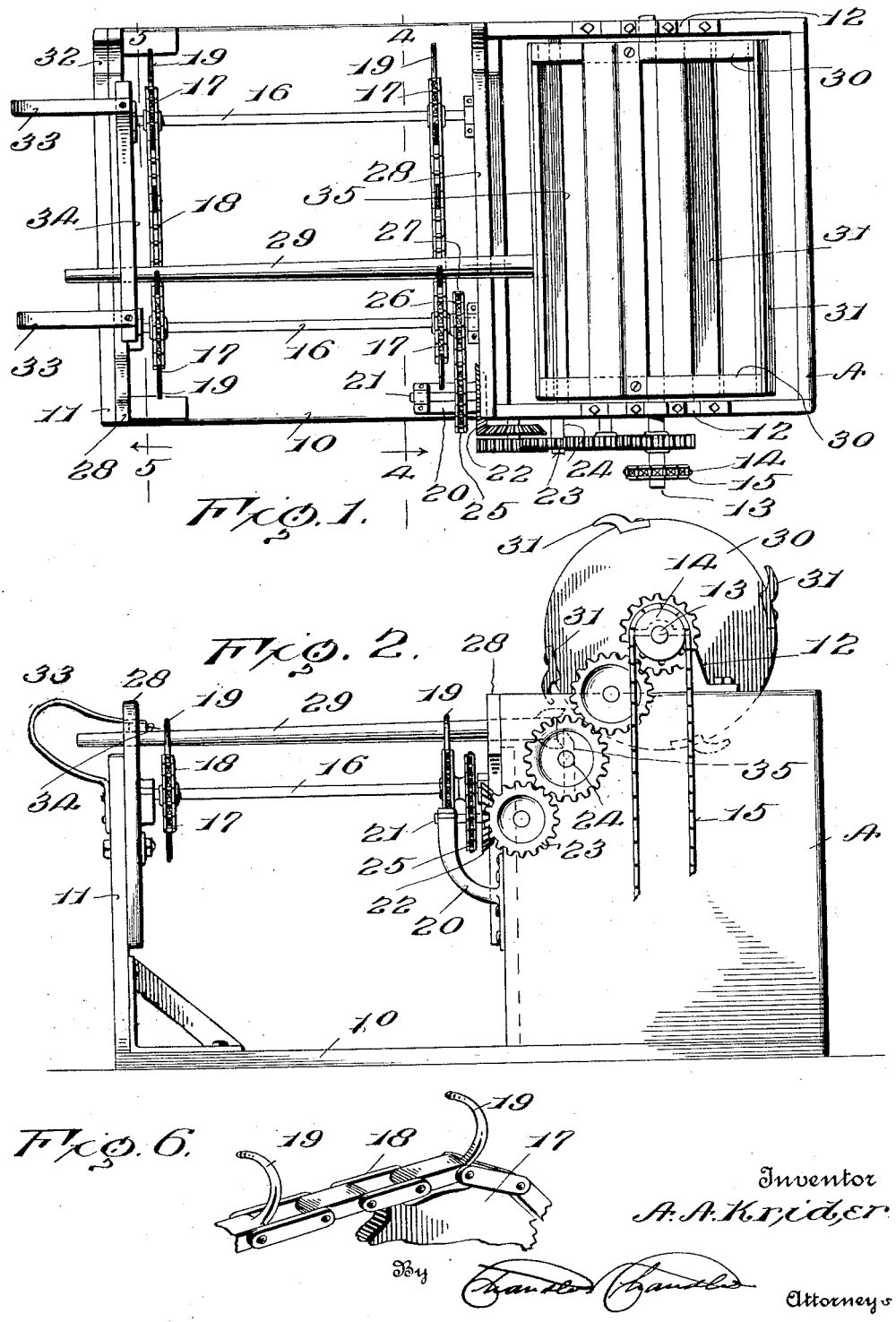

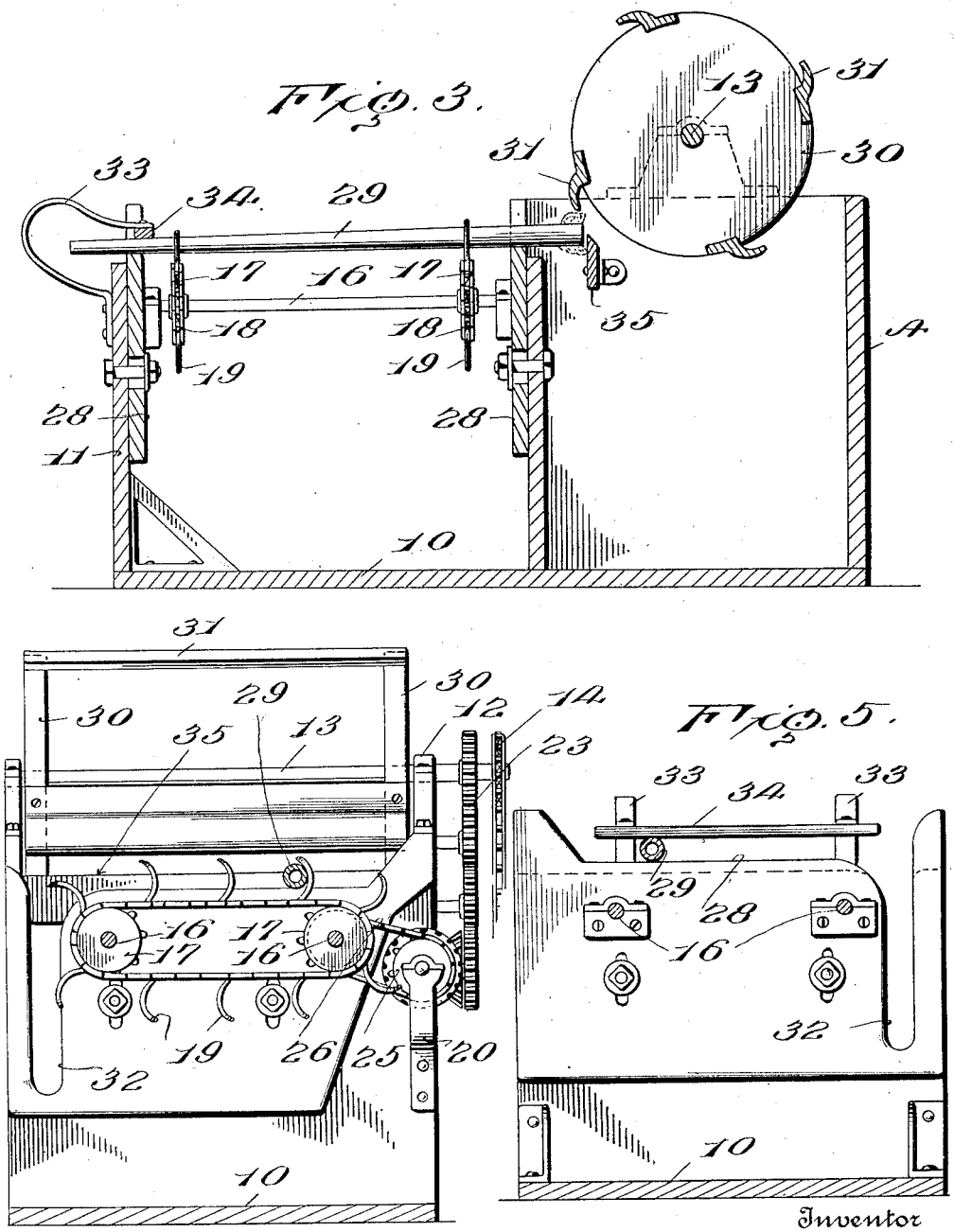

ARTHA A. KRIDER, OF SHIRLEY, INDIANA.

CLEANING-OFF MACHINE.

1,329,841.   Specification of Letters Patent.   Patented Feb. 3, 1920.

Application filed November 30, 1918. Serial No. 264,877.

*To all whom it may concern:*

Be it known that I, ARTHA A. KRIDER, a citizen of the United States, residing at Shirley, in the county of Hancock, State of Indiana, have invented certain new and useful Improvements in Cleaning-Off Machines; and I do hereby declare the following to be a full, clear, and exact description of the invention, such as will enable others skilled in the art to which it appertains to make and use the same.

The invention relates to a blow pipe cleaning machine, and has for its primary object to provide a machine of this character wherein blow pipes can be successively cleaned, as the same will be fed transversely thereof in the path of a cleaning rotor having cutting blades for removing glass from the ends of the blow pipes after the use thereof, thereby thoroughly cleaning the same and avoiding the necessity for the manual handling thereof, for this purpose.

Another object of the invention is, the provision of a machine of this character, wherein the construction thereof is novel in form so that the blow pipes can be placed therein and the same automatically handled for the cleaning thereof, with despatch and the subsequent removal, of the cleaned pipes therefrom.

A further object of the invention is, the provision of a machine of this character, which is simple in construction, thoroughly reliable and efficient in its purpose, strong, durable and inexpensive to manufacture.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1, is a top plan view of the machine constructed in accordance with the invention, showing a blow pipe head therein to be cleaned.

Fig. 2, is an end elevation thereof.

Fig. 3, is a vertical longitudinal sectional view through the machine.

Fig. 4, is a vertical transverse sectional view taken through the blow pipe feeder or conveyer on line 4—4 of Fig. 1.

Fig. 5, is a sectional view on the line 5—5 of Fig. 1.

Fig. 6, is a fragmentary perspective view showing in detail the feeding of blow pipes through the machine.

Similar reference characters indicate corresponding parts throughout the several views in the drawings.

Referring to the drawings in detail, A, designates generally a box-like body which is adapted to receive glass removed from blow pipes, and its bottom 10 is extended laterally from one side thereof and has rising therefrom, a vertical wall 11, which is spaced from the body A and upon opposite ends of said body are mounted suitable bearings 12, in which is journaled a main driving shaft 13, the same being extended beyond one end of the body and carrying a sprocket wheel 14, over which is trained a driving sprocket chain 15 adapted to be driven by a motor or other power mechanism.

Journaled in suitable bearings on the wall 11 and the adjacent side wall of the body A are spaced parallel shafts 16, which are horizontally disposed and at right-angles to the driving shaft 13, and fixed to these shafts 16 are sprocket wheels 17, arranged in pairs thereon and having trained thereover endless sprocket chains 18, constituting companion conveyers or feed belts, each chain 17 being fitted at intervals with hook-like keepers or cleats 19 for engaging blow pipes to be carried by the chains 18, transversely of the machine.

Mounted on the side of the body A opposite the wall 11, and below the shafts 16 is a bearing 20 in which is journaled a countershaft 21, having fixed thereto a beveled gear 22 which meshes with a companion gear of the train of connecting gears 23 with the driving shaft 13, the intermediate gears 23 between the gear 22 and the gear on the shaft 13 being journaled upon stud shafts 24 carried by one end of the body A of the machine, and through the medium of these gears 23 the shaft 21 is driven, which carries a sprocket wheel 25 having trained thereover a sprocket chain 26, the same being also trained over a sprocket wheel 27 fixed to one of the shafts 16, so that motion will be transferred from the shaft 21 to the endless chains 18, for driving the same in one direction.

Mounted on the vertical walls 11 and the adjacent side of the body A, are brackets 28 forming guide runways for each blow pipe 29 which is placed thereon at one end of the runways to lock said blow pipe in the path of the cleats 19, to be taken up thereby and on the travel of the chains 18, said blow pipe will be moved transversely of the machine in the path of a cleaner rotor, hereinafter described.

The cleaner rotor comprises a pair of disks or circular heads 30, which are centrally fixed in spaced relation to each other on the driving shaft 13 and mounted at the peripheries of the disks or heads 30 circumferentially at intervals thereof are striker blades 31, which on the rotation of the disks or heads 30 will act upon the ends of the blow pipes 29, movably supported on the runways 28 so as to remove glass from the blow pipes after the use of said pipes and thereby cleaning the latter for further use.

At the delivery ends of the runways 28 are formed seats 32 constituting pockets for receiving the blow pipes 29 from the conveyer chains 18 after the removal of the glass from the pipes in the cleaning thereof. The blow pipes thus cleaned and resting within the pockets 32 can be removed therefrom for further use.

Mounted upon the wall 11 are brackets 33 for supporting and holding the retaining rail 34 above the outermost track 28 so as to prevent the blow pipes 29 from leaving the tracks 28 or the upward swinging of the outer ends of said pipes when acted upon by the blades 31 of the cleaner rotor for removing the glass from the blow pipes when being fed through the machine.

From the foregoing it is thought that the construction and manner of use of the invention will be clearly understood and therefore a more extended explanation has been omitted.

What is claimed is:

1. In a machine of the class described a body, transverse runways arranged to guide blow pipes crosswise of the body, a rotary cleaner journaled in the body for removing glass from the blow pipes when traveling upon the runways, and means for moving the blow pipes along the runways.

2. In a machine of the class described a body, transverse runways arranged to guide blow pipes crosswise of the body, a rotary cleaner journaled in the body for removing glass from the blow pipes when traveling upon the runways, means for moving the blow pipes along the runways, and means for simultaneously operating the rotor and moving the blow pipes.

3. In a machine of the class described a body, transverse runways arranged to guide blow pipes crosswise of the body, a rotary cleaner journaled in the body for removing glass from the blow pipes when traveling upon the runways, means for moving the blow pipes along the runways, means for simultaneously operating the rotor and moving the blow pipes, and means for retaining the blow pipes upon the runways.

4. In a machine of the class described, a body, transverse runways arranged to guide blow pipes crosswise of the body, a rotary cleaner journaled in the body for removing glass from the blow pipes when traveling upon the runways, means for moving the blow pipes along the runways, means for simultaneously operating the rotor and moving the blow pipes, means for retaining the blow pipes upon the runways, and seats at the delivery ends of the runways for receiving the blow pipes therefrom when cleaned.

5. A cleaning off machine comprising a movable striker blade, means for supporting a blow pipe with its extremities in position for engagement of glass thereon by the striker blade and means for holding the blow pipe yieldably against tilting movement under the influence of the engagement of the striker blade with the glass.

6. A cleaning off machine comprising a movable striker blade, means for supporting a blow pipe in position for engagement by the striker blade of glass thereon, means for holding the blow pipe against longitudinal movement under the influence of the striker blade and means for holding the blow pipe yieldably against tilting movement under the influence of the striker blade.

7. A cleaning off machine comprising a plurality of parallel striker blades revolubly mounted, a run-way disposed at an angle to the direction of revolution of the blades and adapted to receive blow pipes with their ends in position for engagement by the blades of glass at their ends, means for moving the blow pipes individually along the run-way, means for holding the blow pipes against longitudinal movement under the influence of the striker blades and means for holding the blow pipes yieldably against tilting movement under the influence of the striker blades.

In testimony whereof, I affix my signature, in the presence of two witnesses.

ARTHA A. KRIDER.

Witnesses:
  GRACE S. MARSH,
  NOAH BRANSON.